United States Patent [19]
Baskerville et al.

[11] Patent Number: 4,576,766
[45] Date of Patent: Mar. 18, 1986

[54] PHOTOCHROMIC COMPOUNDS AND THEIR USE IN PHOTOREACTIVE LENSES

[75] Inventors: Martin W. Baskerville, Towcester; William R. Maltman, St. Helens, both of England; Stephen N. Oliver, Penryncock, Wales

[73] Assignee: The Plessey Company PLC, Ilford, England

[21] Appl. No.: 530,160

[22] Filed: Sep. 7, 1983

[51] Int. Cl.$^4$ ............................................. B29D 11/00
[52] U.S. Cl. ..................................... 264/1.4; 264/1.1; 264/22; 264/234; 350/354; 351/163
[58] Field of Search ..................... 264/1.1, 1.4, 22, 25, 264/234, 345; 350/354; 351/162, 163

[56] References Cited

U.S. PATENT DOCUMENTS 4,012,232 3/1977 Uhlmann et al. ............... 106/308 B
4,075,015 2/1978 Vinkovic et al. ................... 430/282
4,186,002 1/1980 Heller et al. ............................ 430/1
4,220,708 9/1980 Heller ................................. 430/339

FOREIGN PATENT DOCUMENTS 2346497 4/1974 Fed. Rep. of Germany ...... 351/163
2002752 7/1978 United Kingdom .

Primary Examiner—James Lowe
Attorney, Agent, or Firm—Sughrue, Mion, Zinn, Macpeak, and Seas

[57] ABSTRACT

A method is disclosed for manufacturing transparent plastic articles, primarily plano or opthalmic photoreactive lenses, which comprises incorporating fulgides or fulgimides containing an adamantylidene group in plastics casting or moulding compositions or preformed plastics articles and converting the fulgide or fulgimide in situ into a form in which it confers on the article the property of darkening in the presence of sunlight and fading in its absence.

8 Claims, No Drawings

PHOTOCHROMIC COMPOUNDS AND THEIR USE IN PHOTOREACTIVE LENSES

This invention relates to photochromic articles and is particularly concerned with articles which on exposure to sunlight change to a coloured or more strongly coloured form and revert to their original form on removal or reduction of the UV component of sunlight e.g. in diffuse daylight conditions.

DESCRIPTION OF THE PRIOR ART

One well known group of photochromic articles which behave in the above manner are articles such as ophthalmic lenses made from inorganic glasses containing silver halide particles. Photochromic articles which behave in a similar way and made from organo-metallic compounds in a plastic support are also known from U.S. Pat. No. 4,170,567 but in comparison with the inorganic glass articles have a relatively short life. This is because the photochromic compounds when exposed to sunlight gradually degrade to non-active compounds, a phenomenon known in the art as "fatigue". It is not possible at present to produce photochromic plastic articles with a satisfactory life in an environment where they are subjected to extended periods of exposure to sunlight. A series of photochromic compounds termed "fulgides" and "fulgimides" which are resistant to fatigue is disclosed in British patent specification No. 2,002,752. However, the compounds described in this British specification cannot be used for applications where darkening in sunlight is required since, although they colour in UV light, they revert to a colourless form in white light. Although it is possible to select fulgides which have a low quantum efficiency for bleaching in white light, this is associated with a coloured form which is thermally reltively stable so that reversion to the colourless form at ambient temperatures is unacceptably slow.

SUMMARY OF THE INVENTION

A method has now been devised of incorporating fulgides and fulgimides of the kind disclosed in British patent specification No. 2,002,752 into articles made from plastics materials and of obtaining an article which colours in sunlight and bleaches in the absence of sunlight.

According to the invention there is provided a method of manufacturing a heliochromic plastics article capable of darkening in the presence of sunlight and fading in its absence which comprises incorporating an adamantylidene compound having the general formula (I) below in a material from which the plastics article is to be formed:

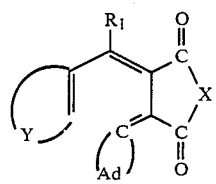
(I)

wherein, $Ad\overset{\frown}{C}$ represents an adamantylidene group or a substituted adamantylidene group $R_1$ represents hydrogen, alkyl, aryl, aralkyl or a heterocyclic group, X represents oxygen or $>NR_2$, in which $R_2$ is hydrogen, aryl, alkyl or aralkyl and

represents an aromatic group, an unsaturated heterocyclic group or a benzannelated heterocyclic group and converting the compound of formula (I) into a compound conferring heliochromic properties on the article during or after formation of said article.

The term "heliochromic" is coined in U.S. patent application Ser. No. 530,161, now abandoned in favor of continuation-in-part U.S. patent application Ser. No. 647,565 of Harry G. Heller et al filed concurrently herewith, the disclosure of which is specifically incorporated herein for further details of the nature of heliochromic compounds and of fulgide and fulgimide precursors therefor and of the preparation of such precursors. Compounds which are heliochromic are defined as compounds possessing the combination of properties considered essential for photoreactive lenses, namely (a) a high quantum efficiency for colouring in ultraviolet light (b) a low quantum efficiency for bleaching with white light and (c) fast thermal fade at ambient temperatures, but not so rapid that the combination of white light bleaching and thermal fade prevent colouring by the ultra-violet component of strong sunlight.

In the above-mentioned Heller et al application, a method is described for converting fulgides and fulgimides disclosed in British specification No. 2,002,752 into heliochromic compounds by several techniques. Such techniques include extended heating to a temperature above about 180° C.

It has now been found that the fulgides and fulgimides which are the precursors of the heliochromic compounds described in the Heller et al application can be incorporated into the material from which a plastic article is to be formed prior to forming the article and then converted in situ into a substance which confers heliochromic properties on the plastic article.

It has not been established with certainty that the fulgide or fulgimide undergoes the same ring closure and 1,5 hydrogen shift to form the corresponding heliochromic compound as described in the Heller et al application cited above. It is possible that the reaction route and final photoreactive compound may be different when the fulgides or fulgimides are subjected to conversion treatment during or after formation of the plastics article. However, for convenience the fulgides and fulgimides of the kind described in British specification No. 2,002,792 are referred to herein as precursors without specifying that the photochromic articles of this invention necessarily contain heliochromic compounds of the formula set forth in claim 1 of the Heller et al application, although there is a strong presumption in favour of this belief.

The method of this invention is particularly applicable to the manufacture of optically clear plastic sunlight and U.V. light filters, especially plastic lenses for spectacles and ski goggles.

The precursor can be included in any materials capable of being used to manufacture plastic lenses e.g. acrylic and polycarbonate polymers, and in particular diethylene glycol bis-allyl carbonate, generally known in the plastics lens art as 'CR 39'. The precursor is incorporated into the material used to form the lenses prior to the shaping or forming of the material into the article. In the case of an injection moulded article it can be added to the powder which is subjected to the injection moulding cycle. Where a casting process is to be employed it can be added to the liquid monomer or polymer before it is used to fill the mould in which the lens is to be cast. In the case of injection moulding, because of the relatively high temperatures that generally occur during injection moulding, the article as formed normally has heliochromic properties. In the case of cast materials the precursor may not be converted in situ into a heliochromic compound at the temperatures prevailing during the curing cycle. In the case of CR39 it is necessary to operate a curing temperature under 100° C. and a substantially colourless or slightly yellow article is generally produced which can be rendered heliochromic by a post-treatment, e.g. irradiation from a UV source.

The method used to form the article determines the method used to convert the precursor to the sunlight reactive form. In the case of injection moulding acrylic articles, the temperature during the moulding cycle is sufficiently high for the conversion to take place during the moulding. In the case of an article made from the material sold by P.P.G. Ltd. under trade name CR39, the precursor can be incorporated into the monomer prior to casting the article. The conversion to the coloured form is then carried out after curing the cast lens. At this stage it may not be possible to subject the article to sufficiently high temperatures to achieve a conversion and in order to achieve the conversion, the article is exposed to actinic irradiation, e.g. UV light source, or a combination of heating and irradiation. Depending on the nature of the precursor it may be necessary to vary the intensity and the temperature of irradiation. One way of variation is to pulse the irradiation. The lens may also be irradiated while it is still within the mould although in general this is unlikely to produce a satisfactory photoreactive lens. The temperature chosen when irradiation is used must clearly be one at which the article is not degraded, in the case of CR39, this is usually below 100° C.

The conversion to a photoreactive state of an article in this manner reduces the number of synthetic stages required to produce the raw material and therefore the ultimate cost of the finished article. In addition the precursor has been found to be able to withstand the conditions for incorporation into certain plastic articles in a more robust manner than when attempts are made to incorporate the heliochromic material made from the precursor.

It is known that organic materials are subject to fatigue due to a combination of factors, one major one being the intensity and wavelength range of UV light to which the article is exposed during its working life. One known way of controlling this is to provide a UV filtering layer in and/or on the exposed surfaces of the article. In the case of a CR39 lens one way this can be done is by imbibing UV absorbers into the lens surface after the precursor has been converted in situ. Another factor is the presence of oxygen and water and the monomer or polymer used should be preferably degassed before use, and the level of free oxygen and water in the matrix reduced to a minimum. This can be done by vacuum degassing at temperatures where the monomer vapour pressure is low. These measures are preferably employed in the method of the present invention in order to prolong the effective life of the lenses.

Satisfactory UV absorbers are those which absorb in wavelength range 290 nm to 400 nm. These include the benzotriazole derivatives e.g. 2(2-hydroxy-5-methyl phenyl)- 2H-benzotriazole sold under trade name "Tinuvin P" by Ciba-Geigy AG. (Preparation in U.S. Pat. No. 3,004,896)

Some of the specific compounds within the general formula (I) above that we have demonstrated can be incorporated in the manner described above are set out below.

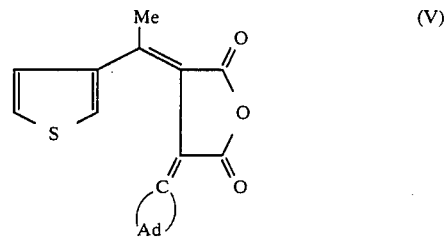

(V)

Where AdC is defined above Adamantylidene - (3-thienyl) ethylidene succinic anhydride.

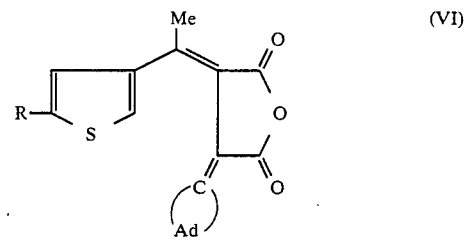

(VI)

R = CH$_3$, C$_6$H$_5$, Br or NO$_2$.

In order to give e.g. a particular tint to the lens it may be necessary to incorporate two or more precursors, the precursors being chosen so that the colour produced by the combination of the products of conversion is the desired tint.

The quantity of the material required depends on the desired induced optical density or ODd which is a measure of the change in light transmission on exposure to sunlight. Induced optical density is defined as:

Log 10 BT/DT, where
  BT = Bleached transmission and
  DT = Darkened transmission.

The conversion of the precursor in situ is preferably accomplished in a simple manner by the application of heat or UV radiation. Other forms of radiation such as micro-waves, x-rays, and electron beam radiation can be employed. Care should be taken to avoid intensities which damage the matrix and/or the organic materials employed.

Suitable methods for the preparation of the precursor materials are described in the Heller et al application cited above and in British specification No. 2,002,752 A, the disclosure of both of which are incorporated herein for the purpose of providing details of the manufacture of the fulgide and fulgimide precursors. The amount of precursor fulgide or fulgimide which is incorporated in the moulding or casting compositions is comparatively small and an amount in the order of 1% by weight or less has been found to be satisfactory.

While specific mention has been made only of allyl carbonate and acrylic polymers for manufacturing the plastic articles of this invention, it will be appreciated that other plastics, including copolymers of the above may also be employed.

The following Examples are given to illustrate the preparation of heliochromic plastics articles in accordance with the invention.

EXAMPLE 1

0.1 gms of the compound of structural formula V above were mixed with 100 gms of the commercially available material sold under the trade name "CR39" by P.P.G. Ltd. which contains 3% IPP as catalyst. CR39 is the brand name for diethylene glycol bis (allyl carbonate) and IPP is isopropyl peroxy percarbonate. The material was vacuum degassed at room temperature after compound V was mixed in. Some of the mixture was then used to fill a two part glass mould, and the mould assembly cured following a conventional curing cycle. After removal from the mould the cured article was pale yellow and not heliochromic, it was then exposed to constant radiation from a UV source for 60 minutes at 50° C. At the end of that time the cast article had acquired heliochromic properties. The lens when exposed at 25° C. to radiation of the Air Mass 2 darkened to 17% transmission and on removal of radiation thermally faded 60% of its induced ODd in one minute. The transmission range was 90% to 17%. The fatigue life is measured by $T_{\frac{1}{2}}$. $T_{\frac{1}{2}}$ is defined as the time taken for induced optical density to decay to half of its initial value when exposed to Air Mass 2 (AM2) at 25° C. from a Xenon lamp. Air Mass 2 is a standard level of radiation having a spectrum and intensity simulating sunlight. It is defined in the paper by Parry Moon in J. Franklin Inst. 230 (1940), pages 583–617.

In the present case for articles made as above $T_{\frac{1}{2}}$ is 2000 minutes. However, by taking the article and placing it in a bath containing an aqueous dispersion of the U.V. absorber sold under the trade name "Tinuvin P" by Ciba-Geigy AG. and imbibing the dispersion into the surface of the article it was possible to increase $T_{\frac{1}{2}}$ to of the order of 5000 minutes. In order to assist imbibation the aqueous dispersion contained 2% propyleneglycol. This alters the transmission range from 90% to 17%, to 90% to 30%.

EXAMPLE 2

1 gm of compound V was intimately mixed with 2 kg Diakon acrylic moulding powder available from I.C.I. The mix was dried at 90° C. for 16 hours in a vacuum over to remove absorbed water which can cause bubble problems during moulding. The dry mix was fed into the hopper of a convention injection moulding machine and processed to produce 60 mm × 2 mm moulded discs. The injection cycle time was 6 minutes with a barrel residence of approximately 5 minutes at 260° C. Injection pressure was 10,000 psi.

The substantially clear mouldings had a darkened transmission of 8.5% when exposed to AM2 irradiation at 25° C. The thermal reverse time to reach half the initial optical density ($\frac{1}{2}$OD) was 152 sec. $\frac{1}{2}$OD is a measure of the fading rate and is defined as the time to fade to $\frac{1}{2}$ of the optical density after removal of the AM2 irradiation.

The fatigue $T_{\frac{1}{2}}$ figure for the moulding under AM2 irradiation at 25° C. was 1400 minutes.

EXAMPLE 3

The procedure for Example 2 was followed except that polycarbonate granules (commercially available as "Makrolon" from Bayer) were used in place of "Diakon" and the injection barrel temperature was 300° C.

The substantially clear moulding had a darkened transmission of 22% when exposed to AM2 irradiation. This suggests some loss or decomposition of precursor during the process at 300° C. The thermal reverse time to reach half the initial OD was 342 sec. The fatigue $T_{\frac{1}{2}}$ figure measured as in Example 2 was 700 minutes.

In the Table I below, the Examples illustrate variations in the treatment required to convert the precursor and obtain a heliochrome article. The procedures used for incorporation of the precursor fulgide were in accordance with Example I. The precursor in all Examples except 26 was the compound of the formula V above.

Examples 4 to 10 illustrate different times of treatment at two temperatures 50° C. and 80° C.

Examples 11 to 14 illustrate at constant time, the effect of varying temperature.

Examples 13, 15, 16 show the effect of varying intensity of U.V. light at constant temperature.

Examples 17 to 19 show the effect of pulsing U.V. radiation at constant exposure time and temperature.

Examples 20 and 21 show the use of different levels of precursor.

Examples 22 to 23 show the use of different levels of precursor.

Example 24 illustrates casting with methyl methacrylate.

Example 25 illustrates the use of the compound of the general formula VI above where R is phenyl. $T_{\frac{1}{2}}$ in this case was 4000 minutes.

In Table 1 % ODG is a measure of the rate of fading and is defined as the % reduction in induced optical density at ambient temperature one minute after removing the lamp. MMA means methyl methacrylate and CHPC means cyclohexyl peroxy percarbonate.

TABLE I

| | 4 | 5 | 6 | 7 | 8 | 9 | 10 | 11 | 12 | 13 | 14 |
|---|---|---|---|---|---|---|---|---|---|---|---|
| Formulation | | | | | | | | | | | |
| Monomer | | | | | | CR39 | | | | | |
| % Precursor (g/100 ml) | 0.11 | 0.11 | 0.11 | 0.11 | 0.11 | 0.11 | 0.11 | 0.11 | 0.11 | 0.11 | 0.11 |
| % Catalyst IPP | 2.3 | 2.3 | 2.3 | 2.3 | 2.3 | 2.3 | 2.3 | 2.3 | 2.3 | 2.3 | 2.3 |
| | | | | | | | | | | IPP | IPP |
| Conversion | | | | | | | | | | | |
| Lamp | 365 Hg | 365 Hg | 365 Hg | 365 Hg | 365 Hg | 365 Hg | 365 Hg | Xenon-Am2 | | | |
| Temperature | 50° C. | 50° C. | 50° C. | 50° C. | 80° C. | 80° C. | 80° C. | 25° C. | 45° C. | 65° C. | 76° C. |
| Intensity | | | | | | | | 100% | 100% | 100% | 100% |
| Time (minutes) | 2 | 40 | 53 | 66 | 5 | 16 | 30 | 60 | 60 | 60 | 60 |
| Photochromic Properties | | | | | | | | | | | |
| Bleached Transmission % | 88.0 | 87.5 | 85.5 | 89.2 | 89.2 | 88.3 | 88.5 | 88.7 | 88.9 | 89.0 | 88.0 |

TABLE I-continued

| | | | | | | | | | | | |
|---|---|---|---|---|---|---|---|---|---|---|---|
| Darkened Transmission % | 23.5 | 20.6 | 18.4 | 17.3 | 37.1 | 26.0 | 21.4 | 52.8 | 30.1 | 16.3 | 14.1 |
| Induced O.D. | 0.573 | 0.630 | 0.667 | 0.712 | 0.381 | 0.531 | 0.617 | 0.237 | 0.485 | 0.737 | 0.795 |
| % ODG - 1 min | 69 | 68 | 66 | 66 | 67 | 70 | 69 | 58 | 70 | 74 | 74 |

| | 15 | 16 | 17 | 18 | 19 | 20 | 21 | 22 | 23 | 24 | 25 |
|---|---|---|---|---|---|---|---|---|---|---|---|
| Formulation | | | | | | | | | | | |
| Monomer | CR39 | CR39 | CR39 | CR39 | CR39 | CR39 | CR39 | CR39 | CR39 | MMA | CR39 |
| % Precursor (g/100 ml) | 0.11 | 0.11 | 0.11 | 0.11 | 0.11 | 0.2 | 0.07 | 0.26 | 0.99 | 0.1 | 0.1 |
| % Catalyst - All IPP except Example 24 which was CHPC | 2.3 IPP | 2.3 IPP | 2.3 IPP | 2.3 IPP | 2.3 IPP | 3 IPP | 3 IPP | 3 IPP | 3 IPP | 0.1 CHPC | 3 IPP |
| Conversion | | | | | | | | | | | |
| Lamp | | | Xenon - $AM^2$ | | | 365 Hg | | Xenon - $AM^2$ | | 365 Hg | 365 Hg |
| Temperature | 65° C. | 65° C. | 65° C. | 65° C. | 65° C. | 50° C. | 64° C. | 64° C. | 64° C. | 70° C. | 60° C. |
| Intensity | 22.5% | 10% | 100% | 100% | 100% | | 100% | 100% | 100% | | |
| Time (minutes) | 60 | 60 | 15 (continuous) | 15 | 15 (pulsed) | 120 | 20 | 20 | 20 | 180 | 20 |
| Photochromic Properties | | | | | | | | | | | |
| Bleached Transmission % | 88.0 | 89.0 | 88.2 | 87.5 | 88.0 | 84.6 | 78.0 | 70 | 69.4 | 77.6 | 74 |
| Darkened Transmission % | 24.3 | 32.2 | 27.9 | 25.7 | 24.9 | 19.0 | 27.2 | 23.9 | 30.2 | 7.6 | 16 |
| Induced O.D. | 0.564 | 0.442 | 0.500 | 0.532 | 0.548 | 0.649 | 0.458 | 0.467 | 0.361 | 1.009 | |
| % ODG - 1 min | 73 | 73 | 69 | 69 | 69 | 62 | 75 | 73 | 74 | 39 | |

Table II below illustrates the conversion of the precursor during injection moulding of an acrylic moulding powder under the conditions specified in Example 2, and the effect of an imbibed U.V. absorbing layer on the fatigue life. The precursor used was the compound of formula V above.

TABLE II

| | 26 | 27 | 28 | 29 | 30 | 31 |
|---|---|---|---|---|---|---|
| Formulation | | | | | | |
| Powder | | | | Diakon | | |
| % Precursor | 0.04 | 0.04 + U.V.Abs imbibed | 0.04 | 0.04 + U.V.Abs imbibed | 0.1 | 0.1 + U.V.Abs imbibed |
| Photochromic Properties | | | | | | |
| Bleached Transmission % | 83 | 79.3 | 85.2 | 76.9 | 88.9 | 84.9 |
| Darkened Transmission % | 5.6 | 51.6 | 5.4 | 15.7 | 1.5 | 4.5 |
| Induced O.D. | 1.771 | .187 | 1.198 | .690 | 1.773 | 1.276 |
| % ODG - 1 | 30 | 23 | 29 | 27 | 24 | 25 |
| $t_{\frac{1}{2}}$ (minutes) | 1766 | 21700 | 1000 | 6500 | 3130 | 8400 |

Table III illustrates the effect of larger conversion times, which generally result in a higher induced optical density but lower bleached transmissions. In all cases the precursor was added to a casting composition. In all cases except Examples 35, 36, 37 and 38 the casting composition was CR39 with 3% IPP as catalyst. For Examples 35 36 37 an MMA composition catalyst with 0.1% CHPC was used, while in Example 38 the composition was CR39 catalysed with 4% CHPC. For the conversion an Hg 365 lamp was used in all cases except in Example 37 where additional irradiation with a Xenon AM2 lamp was employed. Compound V was used as the precursor in all Examples except 33, 35 and 36. Examples 33, 35 and 36 employed the compound of formula VI where R is phenyl.

The U.V. absorber used in Examples 44 and 45 was "Tinuvin P" and was impregnated into the lens by immersion in a solution of the absorber for the time specified in these Examples.

In some cases further improvements in the fatigue free life of plastic lenses prepared in accordance with this invention can be achieved by incorporating a small amount of a comonomer in the casting composition. For example, an amount of up to about 3% of maleic anhydride may be advantageously copolymerised with CR39.

TABLE III

| | 32 | 33 | 34 | 35 | 36 | 37 | 38 | 39 | 40 | 41 | 42 | 43 | 44 | 45 |
|---|---|---|---|---|---|---|---|---|---|---|---|---|---|---|
| Formulation | | | | | | | | | | | | | | |
| % Precursor (g/100 ml) | 0.2 | 0.1 | 0.2 | 0.1 | 0.1 | 0.1 | 0.05 | 0.25 | 0.07 | 0.07 | 0.1 | 0.1 | 0.1 | 0.1 |
| Conversion | | | | | | | | | | | | | | |
| Lamp Hg 365 Temperature 55 to 60° C. | | | | | | + Xenon - $AM_2$ 65° C. | | | | | | | | |
| Time hours | 2 | 0.33 | 1.3 | 0.5 | 3.5 | .75 | 0.57 | 0.57 | 1 | 2 | | 0.75 | 0.75 1 min | 0.75 1.5 min |
| U.V. Absorber imbibed | | | | | | | | | | | | | | |
| Photochromic Properties | | | | | | | | | | | | | | |
| Bleached Transmission % | 85.4 | 73.9 | 81.4 | 74.5 | 78 | 91.9 | 90.5 | 87.5 | 88 | 85 | 86 | 89.2 | 85.4 | 89 |
| Darkened Transmission % | 11.9 | 16.1 | 16.3 | 14.5 | 3.5 | 18.5 | 36.8 | 11.2 | 27 | 25 | 20.1 | 26.8 | 31 | 32.9 |

TABLE III-continued

| | 32 | 33 | 34 | 35 | 36 | 37 | 38 | 39 | 40 | 41 | 42 | 43 | 44 | 45 |
|---|---|---|---|---|---|---|---|---|---|---|---|---|---|---|
| Induced O.D. | 0.856 | 0.662 | 0.698 | 0.711 | 1.348 | 0.698 | 0.391 | 0.893 | 0.513 | 0.530 | 0.631 | 0.522 | 0.44 | 0.43 |
| % ODG - 1 min | 65 | 29 | 61 | 27 | 16 | 40 | 82 | 77 | 60 | 62 | 60 | 73 | 70 | 70 |
| t½ minutes | 1542 | 3314 | 2574 | 3530 | 11296 | 1170 | 199 | 1476 | | 900 | 1697 | 2486 | 3564 | 2709 |

We claim:

1. A method of manufacturing a heliochromic plastics article capable of darkening in the presence of sunlight and fading in its absence which comprises the steps (a) incorporating an adamantylidene compound having the general formula (I) below in a material from which the plastics article is to be formed:

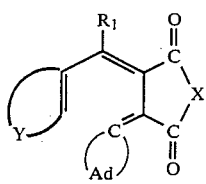

wherein AdC represents an adamantylidene group or a substituted adamantylidene group $R_1$ represents hydrogen, alkyl, aryl, aralkyl or a heterocyclic group, X represents oxygen or >$NR_2$, in which $R_2$ is hydrogen, aryl, alkyl or aralkyl and

represents an aromatic group, an unsaturated heterocyclic group or a benzannelated heterocyclic group, and (b) converting the compound of formula (I) into a compound conferring heliochromic properties on the article during or after formation of said article by heating or by prolonged U.V. irradiation.

2. A method according to claim 1, wherein the plastics article is formed by casting a polymerizable or curable composition and a compound of formula (1) is added to the composition prior to effecting polymerization or curing thereof, and wherein after effecting the polymerization or curing step the article is subjected to a post-treatment comprising irradiation or heating, whereby the compound of formula (1) undergoes a change which confers heliochromic properties on the article.

3. A method according to claim 2, wherein the moulding composition comprises diethylene glycol bis-(allyl carbonate) and a curing agent therefor.

4. A method according to claim 3, wherein an ultraviolet light absorber or filter is included in the article whereby the effective life of the article is extended.

5. A method according to claim 4, wherein the U.V. absorber or filter is present in a surface layer.

6. A method according to claim 1, wherein the plastics article is formed by injection moulding a moulding powder containing a compound of the formula (1), the moulding conditions being such that the compound of the formula (1) undergoes a change during the moulding step which confers heliochromic properties on the resultant article.

7. A method according to claim 1, wherein the plastic article is a plastic lens.

8. A method of forming a photochromic article capable of darkening with presence of sunlight and thermally fading in the absence thereof at ambient temperatures which comprises incorporating a precursor of the general formula (1) set forth in claim 1 into the material from which the article is formed prior to forming and converting it in situ into a material which confers a heliochromic character on the article, said precursor having the property that if heated at a temperature of at least 180° C. or if irradiated with U.V. light it is converted to a compound of general formula (11) below and on continued heating or irradiation undergoes at 1:5 hydrogen shift to a pale-coloured compound of general formula (111) below which pale coloured compound is reversibly converted to a darker compound of general formula (1V) under the stimulation of sunlight

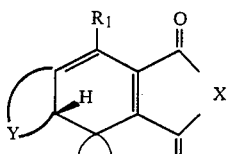
(II)

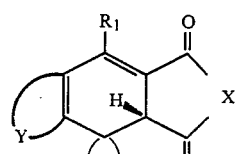
(III)

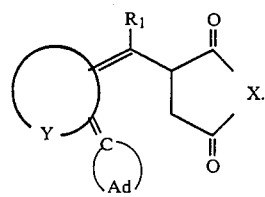
(IV)

* * * * *